United States Patent [19]

Fröscher et al.

[11] 4,317,631
[45] Mar. 2, 1982

[54] METHOD AND APPARATUS FOR MEASURING ATTENUATION IN LIGHT WAVEGUIDES FOR COMMUNICATIONS TRANSMISSION PURPOSES

[75] Inventors: Peter Fröscher; Joachim Schulze, both of Berlin, Fed. Rep. of Germany

[73] Assignee: Siemens Aktiengesellschaft, Munich, Fed. Rep. of Germany

[21] Appl. No.: 79,599

[22] Filed: Sep. 27, 1979

[30] Foreign Application Priority Data

Nov. 8, 1978 [DE] Fed. Rep. of Germany ....... 2848930

[51] Int. Cl.³ .................... G01N 21/59; G01N 21/84
[52] U.S. Cl. .................................. 356/73.1; 250/578
[58] Field of Search ................... 356/73.1; 250/578

[56] References Cited

U.S. PATENT DOCUMENTS 3,510,658 5/1970 Rabedeau ........................ 250/578
4,215,937 8/1980 Borsuk .............................. 356/73.1
4,234,253 11/1980 Higginbotham et al. .......... 356/73.1

OTHER PUBLICATIONS

"Simple Testing Methods Giving Users a Feel for Cable Parameters", Chesler et al., Electronics, Aug. 5, 1976, pp. 90–92.

*Primary Examiner*—Vincent P. McGraw
*Attorney, Agent, or Firm*—Kenyon & Kenyon

[57] ABSTRACT

In a method and apparatus for coupling a test piece to the transmitter and the receiver of an apparatus for measuring the attenuation of light waveguides, either a large area light emitter is inserted into the measuring path on the input side of the test piece, or a large area photo receiver is inserted on the output side of the test piece. The insertion of the large area photo receiver can be accomplished by means of a semitransparent or hinged mirror.

16 Claims, 6 Drawing Figures

METHOD AND APPARATUS FOR MEASURING ATTENUATION IN LIGHT WAVEGUIDES FOR COMMUNICATIONS TRANSMISSION PURPOSES

BACKGROUND OF THE INVENTION

1. Field of the Invention

This invention relates to a method for measuring the attenuation in light waveguides for communications transmission purposes and for coupling the test piece to the transmitter and receiver of the measuring apparatus.

2. Discussion of the Prior Art

To measure attenuation in optical light waveguides, only those modes must be picked up which can propagate in the light waveguide core. At discontinuities, such as splices, plug connections or branching points, leakage waves are excited which must be suppressed in the attenuation measurement. In addition, the light carried in the light waveguide jacket must be suppressed because it would stimulate too low an attenuation value.

The optical measuring signal is therefore conducted between the transmitter and the receiver via so-called mode strippers and mode mixers when entering as well as when leaving the test piece. These can be light waveguides, for instance, 500 m long and wound with a small radius, the geometry and index of refraction profile of which is adequate for those of the test piece.

Prior to the measurement, the test piece must be coupled into the ray path between the transmitter and the receiver. In order to do this with a minimum of losses, the light exit and entrance surfaces must be adjusted exactly. To do this is difficult because the lines are not terminated with self-adjusting plug devices. The light waveguides to be tested have a small numerical aperture and very small entrance and exit surfaces (about 0.003 mm$^2$). For this reason, the adjustment, which is performed with three dimensional micro-manipulators, is almost impossible and at best is very difficult and time consuming.

Special devices for this purpose which solve the problem in a suitable form, are not available. Heretofore, as a laboratory makeshift, a light waveguide, serving as a mode stripper, has been inserted into the optical ray path, using a nondetachable splice to the test piece. However, this is very time consuming and therefore, uneconomical. It is therefore desirable to use mode strippers which are arranged in the vicinity of the transmitter and the receiver.

It is an object of the present invention to substantially simplify the difficult coupling operations described above.

SUMMARY OF THE INVENTION

According to the present invention, the above described problem is solved by inserting into the meauring path either a large area light emitter, on the input side of the test piece, or a large area photo receiver, on the output side of the test piece, for adjusting the couplings between the transmitter and the test piece or between the test piece and the receiver, respectively.

By at first using a light emitter or photo receiver having a large area, relative to the size of the input and output area of the light waveguide, it becomes possible to establish almost 100% coupling between the test piece and the transmitter or the receiver by simple means. The adjustment problem is thereby narrowed down to the coupling between the receiver or the transmitter and the test piece alone. The optimum coupling in the measuring apparatus is then substantially easier to find and establish.

The method according to the invention can thus be used on the transmitter as well as on the receiver side. For the sake of simplicity, only the application on the receiver side will be discussed in the following, but the corresponding design on the transmitter side is likewise considered as part of the invention.

For carrying out the method, an apparatus which is found to be particularly advantageous includes a mirror between the test piece and the receiver by means of which the optical measuring signal can be fed either to a large area photo receiver or to the measuring path. The mirror can be either semitransparent or hinged for movement. In the first case, it can be arranged rigidly in the ray path. In the second case, it can be swung out of the ray path after the partial coupling is accomplished.

In one embodiment of the invention, the large area photo receiver can be arranged in a circuit which is electrically parallel to the measuring path, and can be selected by means of an electric double throw switch, so that the selection of the differnt paths for adjusting and measuring can then be accomplished by purely electrical means.

However, the large area photo receiver and a mode stripper with its coupling device arranged in the measuring path can also be rigidly connected to each other. In this way the two parts, rigidly coupled to each other, constitute double throw device which has two accurately defined switch positions by which light from the same source may be fed to either part.

DETAILED DESCRIPTION OF THE INVENTION

Figure 1:
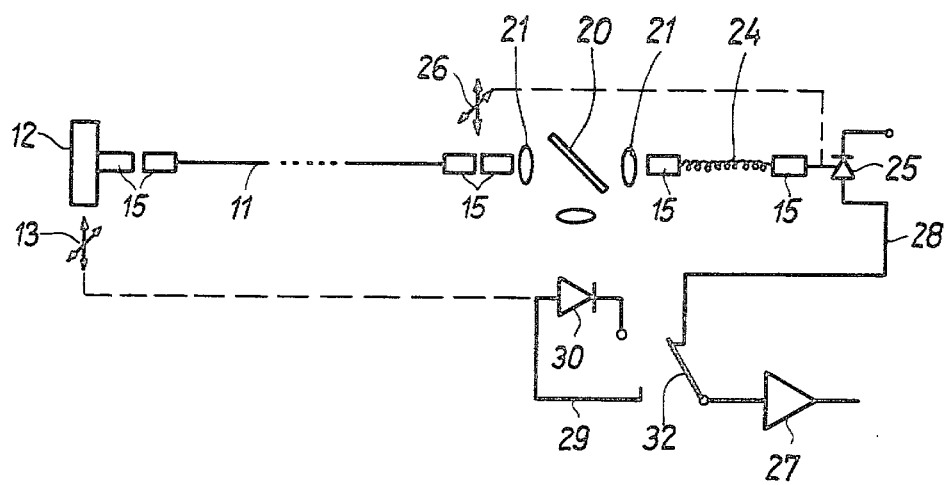
FIG. 1 is a schematic diagram of a measuring apparatus according to the invention.

A test piece 11, to be measured, is located between an optical transmitter 12 and a receiver 27, shown as an amplifier. Test piece 11 is coupled into the measuring section via suitable coupling devices 15. For the sake of simplicity, the mode strippers and mixers on the transmitter side are not shown. A mirror 20, supplemented by a system of lenses 21, allows the optical signal to be fed to the measuring section proper which consists of elements 24, 25, and 28, or to a large area photo receiver 30 and its output circuit 29. Mirror 20 may be semitransparent or designed so that it can be swung out of the ray path. By means of photo receiver 30, the position of transmitter 12 can first be established, relative to the test piece 11, in coordinate directions x, y, z, via a micro manipulator 13. The test piece 11 can then be adjusted, relative to receiver 27, by a micro manipulator 26, through test photo diode 25, which converts the optical signal into an electrical signal.

Figure 2:
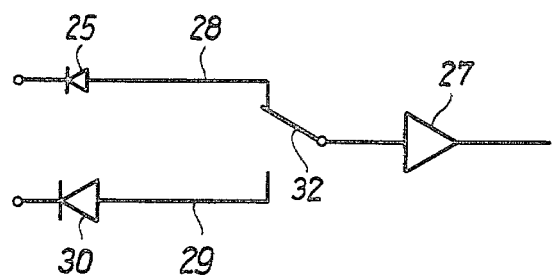
FIG. 2 shows an equivalent circuit for the measuring and adjustment section of FIG. 1.

By means of a single pole double throw switch 32, either of the electrically parallel circuits 28 or 29 (as shown also in FIG. 2) can be selected and the chosen signal fed to receiver 27.

Figure 3:
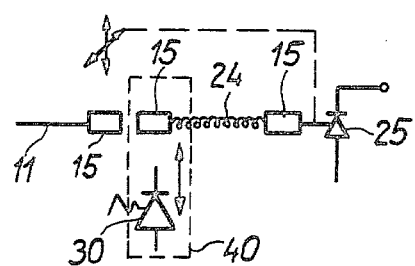
FIG. 3 is a schematic diagram of an arrangement for mechanically switching a large area photo receiver into place.

FIG. 3 shows an alternative arrangement for first coupling large-area photo receiver 30 and, then coupling measuring path containing elements 24, 25, and 28 to test piece 11. In this case, large area photo receiver 30 and mode stripper 24, feeding test photo diode 25 and electrical branch 28 and forming the measuring path, with its plug in device 15, are rigidly connected to each other via a suitable supporting device 40. Two exactly defined switching positions of the device 40 insure that test piece 11 can be coupled either to large area photo receiver 30 or to mode stripper 24 with its plug in device 15.

In all cases using the illustrated embodiments discussed above, the procedure is to first couple test piece 11 to large area photo receiver 30. Then transmitter 12 is optimally adjusted, relative to test piece 11, by means of micro-manipulator 13. Only thereafter is the test piece coupled into the measuring path formed by elements 24, 25 and 28, being then brought into optimal adjustment, relative to receiver 27 by means of micro manipulator 26 and photo diode 25.

The application of the principles of the invention has been described by means of illustrative embodiments on the receiver side. It will be understood by those skilled in the art that the teachings of the invention are equally applicable to the transmitter side of a measuring apparatus. Thus, instead of a large area light receiver, a large area light emitter may be switched into the place of optical transmitter 12. The interchange may likewise be made by means of a semitransparent mirror and an electrical switch connected to illuminate one source or the other, or by swinging a mirror into place, or by a rigid connection between transmitter 12 and the large area light emitter which provides exact placement of one or the other as a source for the measurement apparatus. In this case, the receiving element to the testing apparatus need only consist of test photodiode 25.

Figure 4:
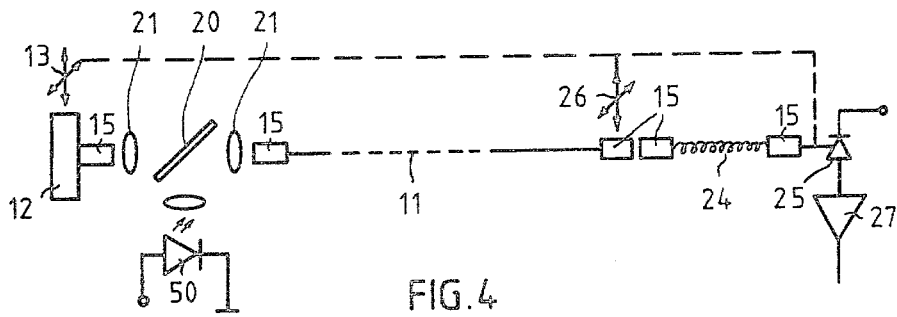
FIG. 4 is a schematic diagram of an alternative embodiment of a measuring apparatus in accordance with the teachings of the invention.

FIG. 4 shows an embodiment of the invention wherein a large-area light emitter 50 may be coupled into the path of the light ray at the transmitter side, as an adjustment aid, with the help of a semi-transparent or hinged mirror 20 and supplemental lens system 21. The coupling of the test piece to receiver 27 is first adjusted using large-area light emitter 50 as a source. For this purpose, the output signal of photo diode 25, which converts the optical signal into an electrical signal, is adjusted while manipulating the output of the test piece by means of micro manipulator 26. Subsequently, the location of actual optical transmitter 12 is adjusted by means of micro manipulator 13.

Figure 5:
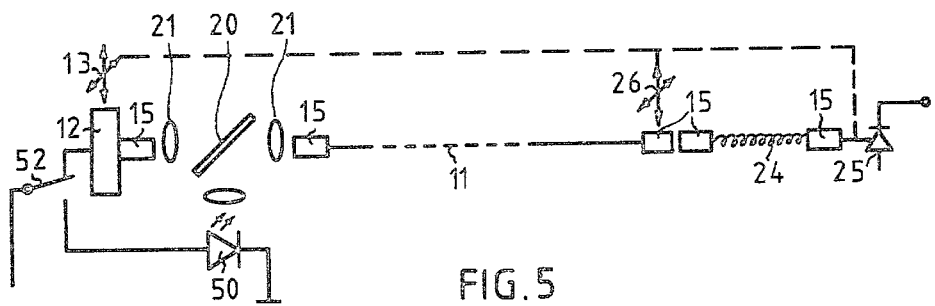
FIG. 5 is a schematic diagram of an apparatus like that of FIG. 4 in which the large area light emitter and an optical transmitter are electrically switched.

FIG. 5 illustrates an embodiment in which the large-area light emitter 50 or the normal optical transmitter 12 may be chosen by means of single pole double throw switch 52.

Figure 6:
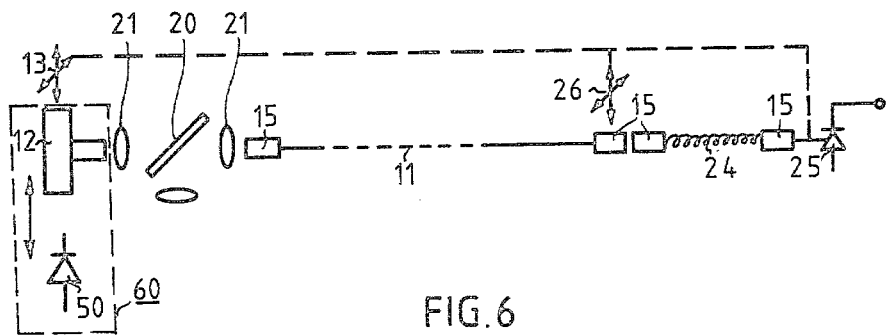
FIG. 6 is a schematic diagram of an arrangement for mechanically substituting the large area light source of FIG. 4 in the location of the optical transmitter.

FIG. 6 shows coupling of either large-area light emitter 50 or optical transmitter 12 to test piece 11 using a mechanical linkage similar to that used for the detectors in FIG. 3. In this case, large-area light emitter 50 and optical transmitter 12 are interconnected by rigid connecting support 60. Two accurately defined switch positions of double-throw support 60 insure that the input to test piece 11 may be coupled to either large-area light emitter 50 or to optical transmitter 12.

What is claimed is:

1. The method for measuring the attenuation in a test piece of light waveguide used for communications transmission purposes, the test piece having an input and an output, in an apparatus having a test transmitter and a measuring section comprising a test photo diode coupled to a receiver, the apparatus having simplified coupling of the transmitter to the input of the test piece and of the output of the test piece to the measuring section, the coupling of the transmitter to the test piece and of the test piece to the measuring section being separately adjustable, which comprises the steps of:
   providing a large area photo receiver having an output signal,
   coupling the large area photo receiver to the light path at the output of the test piece;
   adjusting the coupling between the transmitter and the input of the test piece to optimize coupling to the test piece by means of the photo receiver; and
   measuring the attenuation by means of the measuring section coupled to the light path at the output of the test piece.

2. The method of claim 1 comprising the further step of:
   adjusting the coupling between the output of the test piece and the input to the measuring section to optimize coupling to the measurement section prior to making the measurement.

3. The method for measuring the attenuation in a test piece of light waveguide used for communications transmission purposes, the test piece having an input and an output, in an apparatus having an optical test transmitter and a measuring section comprising a test photo diode coupled to a receiver, the apparatus having simplified coupling of the transmitter to the input of the test piece and of the output of the test piece to the measuring section, the coupling of the test transmitter to the test piece and of the test piece to the measuring section being separately adjustable, which comprises the steps of:
   providing a large area light emitter;
   inserting the large area light emitter into the path between the transmitter and the receiver and on the input side of the test piece;
   adjusting the coupling between the test piece and the receiver to optimize the output signal of the receiver using the large area light emitter; and
   coupling the optical test transmitter to the input of the test piece.

4. The method of claim 3 and comprising the further step of:
   adjusting the coupling between the optical test transmitter and the input of the test piece to optimize coupling to the test piece prior to making the measurement.

5. Apparatus for measuring the attenuation in a test piece of light waveguide, the test piece having an input and an output, comprising:
   a test transmitter having an output for an optical measuring signal;
   first coupling means for coupling the output of the test transmitter to the input of the test piece;
   means for adjusting the coupling of the output of the test transmitter to the input of the test piece;
   a measuring path comprising an input, a test diode for receiving the optical measuring signal and having an output for an electric signal, and a receiver having an input coupled to the output of the diode;

second coupling means for coupling the output of the test piece to the input of the measuring path;

means for adjusting the coupling of the output of the test piece to the input of the measuring path;

a large area photo receiver located adjacent to the output side of the test piece and having an output for an electrical signal which is adapted to be coupled to the receiver;

means for coupling the large area photo receiver to the output of the test piece instead of the measuring path; and means for changing the coupling of the receiver input to the output of the large area photoreceiver.

6. Apparatus according to claim 5, in which the measuring path includes a mode stripper having an input adapted to be coupled to the output of the test piece and an output coupled to the photo diode, and further comprising:

support means connecting the input of the mode stripper and the large photo receiver in a rigid assembly, the support means being adapted for displacement to couple at least one of the input of the mode stripper and the input of the large photo receiver to the output of the test piece.

7. Apparatus according to claim 5 in which the means for coupling the large area photo receiver to the output of the test piece comprises a mirror on the output side of the test piece for feeding at least a portion of the optical measuring signal to the large area photoreceiver.

8. Apparatus according to claim 7 in which the mirror is semi-transparent.

9. Apparatus according to claim 7 in which the mirror is hinged for motion into position at the output side of the test piece.

10. Apparatus according to claim 5 further comprising:

a double throw switch for connecting at least one of the output of the large area photo receiver and the measuring path to the receiver.

11. Apparatus for measuring the attenuation in a test piece of light waveguide, the test piece having an input and an output, comprising:

a test transmitter having an output for an optical measuring signal;

first coupling means for coupling the output of the transmitter to the input of the test piece;

means for adjusting the coupling of the output of the test transmitter to the input of the test piece;

a measuring path comprising an input, a test diode for receiving the optical measuring signal and having an output for an electric signal, and a receiver having an input coupled to the output of the diode;

second coupling means for coupling the output of the test piece to the input of the measuring path;

means for adjusting the coupling of the output of the test piece to the input of the measuring path;

a large area light emitter located adjacent to the input side of the test piece; and means for coupling the large area light emitter to the input of the test piece instead of the test transmitter.

12. The apparatus of claim 11 in which the means for coupling the large area light emitter to the input of the test piece comprises a mirror at the input side of the test piece for directing light from at least one of the large area light emitter and the test transmitter to the input of the test piece.

13. The apparatus of claim 12 in which the mirror is semi-transparent.

14. The apparatus of claim 12 in which the mirror is hinged for motion into position on the input side of the test piece.

15. The apparatus of claim 12 and further comprising:

a double throw switch for supplying power to at least one of the large area emitter and the transmitter light source.

16. Apparatus according to claim 12 further comprising:

a mode stripper receiving light from the test transmitter and having an output adapted to be coupled to the input of the test piece;

support means connecting the output of the mode stripper and the large area light emitter in a rigid assembly, the support means being adapted for displacement to couple at least one of the output of the mode stripper and the large area light emitter to the input of the first test piece.

* * * * *